(12) United States Patent
Dettinger et al.

(10) Patent No.: US 7,810,099 B2
(45) Date of Patent: Oct. 5, 2010

(54) OPTIMIZING WORKFLOW EXECUTION AGAINST A HETEROGENEOUS GRID COMPUTING TOPOLOGY

(75) Inventors: Richard D. Dettinger, Rochester, MN (US); Cale T. Rath, Byron, MN (US); Richard J. Stevens, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 1873 days.

(21) Appl. No.: 10/870,374

(22) Filed: Jun. 17, 2004

(65) Prior Publication Data

US 2005/0283786 A1 Dec. 22, 2005

(51) Int. Cl.
G06F 9/46 (2006.01)
G06F 15/16 (2006.01)
G06F 15/173 (2006.01)
G06F 9/44 (2006.01)

(52) U.S. Cl. ............... 718/106; 718/102; 718/104; 709/201; 709/202; 709/226; 705/7; 705/8; 705/9

(58) Field of Classification Search ......... 718/102–106; 709/201–202, 226; 705/7–9; 707/1
See application file for complete search history.

(56) References Cited

U.S. PATENT DOCUMENTS

| | | | | |
|---|---|---|---|---|
| 5,408,663 A | * | 4/1995 | Miller ..................... | 718/104 |
| 5,671,361 A | * | 9/1997 | Brown et al. ............... | 705/9 |
| 5,715,457 A | * | 2/1998 | Wakatani .................. | 718/105 |
| 5,826,239 A | * | 10/1998 | Du et al. .................. | 705/8 |
| 5,848,394 A | * | 12/1998 | D'Arrigo et al. ............ | 705/8 |
| 5,870,545 A | * | 2/1999 | Davis et al. ................ | 709/201 |
| 5,960,404 A | * | 9/1999 | Chaar et al. ................ | 705/8 |
| 6,115,646 A | * | 9/2000 | Fiszman et al. ............. | 700/181 |
| 6,401,111 B1 | * | 6/2002 | Dan et al. .................. | 709/204 |
| 6,678,716 B1 | * | 1/2004 | Pronsati et al. ............. | 709/201 |
| 6,711,616 B1 | * | 3/2004 | Stamm et al. ............... | 709/226 |
| 6,725,227 B1 | | 4/2004 | Li | |
| 6,816,882 B1 | * | 11/2004 | Conner et al. ............... | 709/203 |
| 7,035,808 B1 | * | 4/2006 | Ford ....................... | 705/7 |
| 7,085,853 B2 | * | 8/2006 | Volkov et al. ............... | 709/248 |
| 7,299,244 B2 | * | 11/2007 | Hertling et al. ............. | 707/104.1 |
| 7,346,531 B2 | * | 3/2008 | Jacobs ..................... | 705/8 |

(Continued)

OTHER PUBLICATIONS

Casati et al, "Managing Workflow Authorization Contrains Through Active Database Technology", Information Systems Frontiers, pp. 319-328, 2001.*

(Continued)

Primary Examiner—Meng-Ai An
Assistant Examiner—Jennifer N To
(74) Attorney, Agent, or Firm—Patterson & Sheridan, LLP (57) ABSTRACT

Methods and apparatus to optimize workflow execution by the intelligent dispatching of workflow tasks against a grid computing system or infrastructure are provided. For some embodiments, a grid task dispatcher may be configured to dispatch tasks in a manner that takes into account information about an entire workflow, rather than just an individual task. Utilizing information about the tasks (task metadata), such a workflow-scoped task dispatcher may more optimally assign work to compute resources available on the grid, leading to a decrease in workflow execution time and more efficient use of grid computing resources.

24 Claims, 5 Drawing Sheets

U.S. PATENT DOCUMENTS

| | | | |
|---|---|---|---|
| 7,401,112 B1 * | 7/2008 | Matz et al. | 709/202 |
| 7,475,107 B2 * | 1/2009 | Maconi et al. | 709/202 |
| 2002/0152254 A1 * | 10/2002 | Teng | 709/100 |
| 2003/0144982 A1 * | 7/2003 | Reulein et al. | 707/1 |
| 2004/0006589 A1 * | 1/2004 | Maconi et al. | 709/202 |
| 2004/0054997 A1 * | 3/2004 | Katragadda et al. | 718/102 |
| 2004/0073673 A1 * | 4/2004 | Santos et al. | 709/226 |

OTHER PUBLICATIONS

Sarmenta et al., "Bayanihan Computing .NET: Grid Computing With XML Web Services", IEEE, pp. 1-2, 2002.*

Czajkowski et al., "Grid Information Services for Distributed Resource Sharing", IEEE, pp. 1-14, 2001.*

\* cited by examiner

OPTIMIZING WORKFLOW EXECUTION AGAINST A HETEROGENEOUS GRID COMPUTING TOPOLOGY

BACKGROUND OF THE INVENTION

1. Field of the Invention

The present invention generally relates to workflow processing and, more particularly to optimizing workflow execution by dispatching tasks thereof to nodes of a grid computing system.

2. Description of the Related Art

Two emerging technologies that allow efficient use of computing resources, for example, within a collaborative environment are workflow processing and grid computing. Workflow processing technologies typically provide application integration capabilities, enabling a series of separate software components to be run in a defined sequence facilitating construction of larger solutions from individual software components. Workflow implementations are typically driven from a workflow definition that identifies the sequence of tasks to perform and data flows from one task to another. Some workflow environments may be configured to optimize overall workflow execution, for example, by running certain tasks in parallel, typically as multiple processing threads on the same computing node running the overall workflow application.

Grid computing is an architecture and corresponding infrastructure that is based on the concept of a pool of compute resources that can be applied dynamically to service requests, from various entities, for those resources. The pooled resources may include specialized processing resources contained on high-end servers or relatively normal processing resources contained on relatively low-end individual workstations. In any case, by pooling the resources together, requesting entities with access to the grid are presented, in effect, with one large virtual computing resource they may utilize to run tasks.

A typical grid infrastructure involves a task dispatch component that identifies a compute resource from the pool of resources to service the next task to be performed. Current dispatch algorithms typically focus on matching a task to a node based on either resource requirements of the task or available runtime resources of the node. As an example, if a task can only run under the Linux® operating system (Linux is a trademark of Linus Torvalds in the United States, other countries, or both), the task thus must be dispatched to a node running the Linux® operating system. As another example, current workloads of individual nodes in the compute resource pool may be monitored and tasks may be assigned to nodes that are less busy. The typical grid computing solution has the task dispatch component working off a queue of tasks to be performed, selecting a task to be performed, dispatching the selected task to a node in the compute resource pool and then processing the next task in the queue.

It may be possible to utilize a grid computing infrastructure for execution of workflow oriented solutions, for example, by integrating a workflow processing engine and grid task dispatcher. Using the typical dispatch algorithm described above, as tasks were ready to execute within the workflow, they would be submitted to the grid task dispatcher and routed to the next available node for execution. While this model may enable the use of a grid computing environment for workflow execution, it may lead to sub-optimal workflow processing for failure to take into account a number of considerations, such as the variety of compute needs of different tasks within a given workflow, the difference in compute resources of various nodes in the grid environment, and possible synergistic relationships or contention that may exist between sequential or parallel tasks in the workflow.

Accordingly, there is a need for techniques to optimize workflow execution within a grid computing infrastructure.

SUMMARY OF THE INVENTION

Embodiments of the present invention provide methods and systems for optimizing workflow execution.

One embodiment provides a method of executing a workflow in a grid computing environment. The method generally includes obtaining a sequence of tasks to be performed as part of the workflow, obtaining task metadata providing information regarding resource requirements for one or more of the tasks, monitoring a current state of the grid computing environment to identify and obtain information regarding available resources of one or more computing nodes in the grid computing environment, and dispatching one or more of the tasks to one or more of the nodes, based on the task metadata and the current state of the grid.

Another embodiment provides a computer-readable medium containing a program for executing a workflow in a grid computing environment. When executed by a processor, the program performs operations generally including obtaining a sequence of tasks to be performed as part of the workflow, obtaining task metadata providing information regarding resource requirements for one or more of the tasks, monitoring a current state of the grid computing environment to identify and obtain information regarding available resources of one or more computing nodes in the grid computing environment, and dispatching one or more of the tasks to one or more of the nodes, based on the task metadata and the current state of the grid.

Another embodiment provides a system for executing a workflow in a grid computing environment generally including a sequence of tasks to be performed as part of the workflow, task metadata including, at least, information regarding resources required by one or more of the tasks, and a workflow-scoped task dispatcher. The workflow-scoped task dispatcher is generally configured to monitor a current state of the grid computing environment to identify and obtain information regarding available resources of one or more computing nodes in the grid computing environment and dispatch one or more of the tasks to one or more of the nodes, based on the task metadata and the current state of the grid.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention provide methods and apparatus to optimize workflow execution by the intelligent dispatching of workflow tasks against a grid computing system or infrastructure (hereinafter, simply a "grid"). In effect, a grid task dispatcher may be configured to dispatch tasks in a manner that takes into account information about an entire workflow, rather than just an individual task. Unlike conventional task-scoped task dispatchers, such a workflow-scoped task dispatcher may receive as input, an entire workflow to be executed against the underlying grid, rather than a single task. Utilizing information about the tasks (task metadata), the workflow-scoped task dispatcher may more optimally assign work to compute resources available on the grid, leading to a decrease in workflow execution time and more efficient use of grid computing resources.

As used herein, the term grid computing system generally refers to a connected group of pooled computing resources which may include, for example, computing resources (e.g., CPUs, memory, and/or software components) located on any combination of dedicated servers, general purpose (e.g., desktop) computers, and the like. As used herein, the term workflow generally refers to a combination of tasks that are to be performed, collectively, to achieve a desired result. As used herein, the term task (or workflow) metadata generally refers to descriptive information about tasks to be performed as part of a workflow and may include, among other things, an identification of input required by and/or output generated by a task, a set of resources required to run a task (e.g., CPU, memory, and/or operating system requirements), and an identification of tasks that may be performed in parallel.

Figure 1:
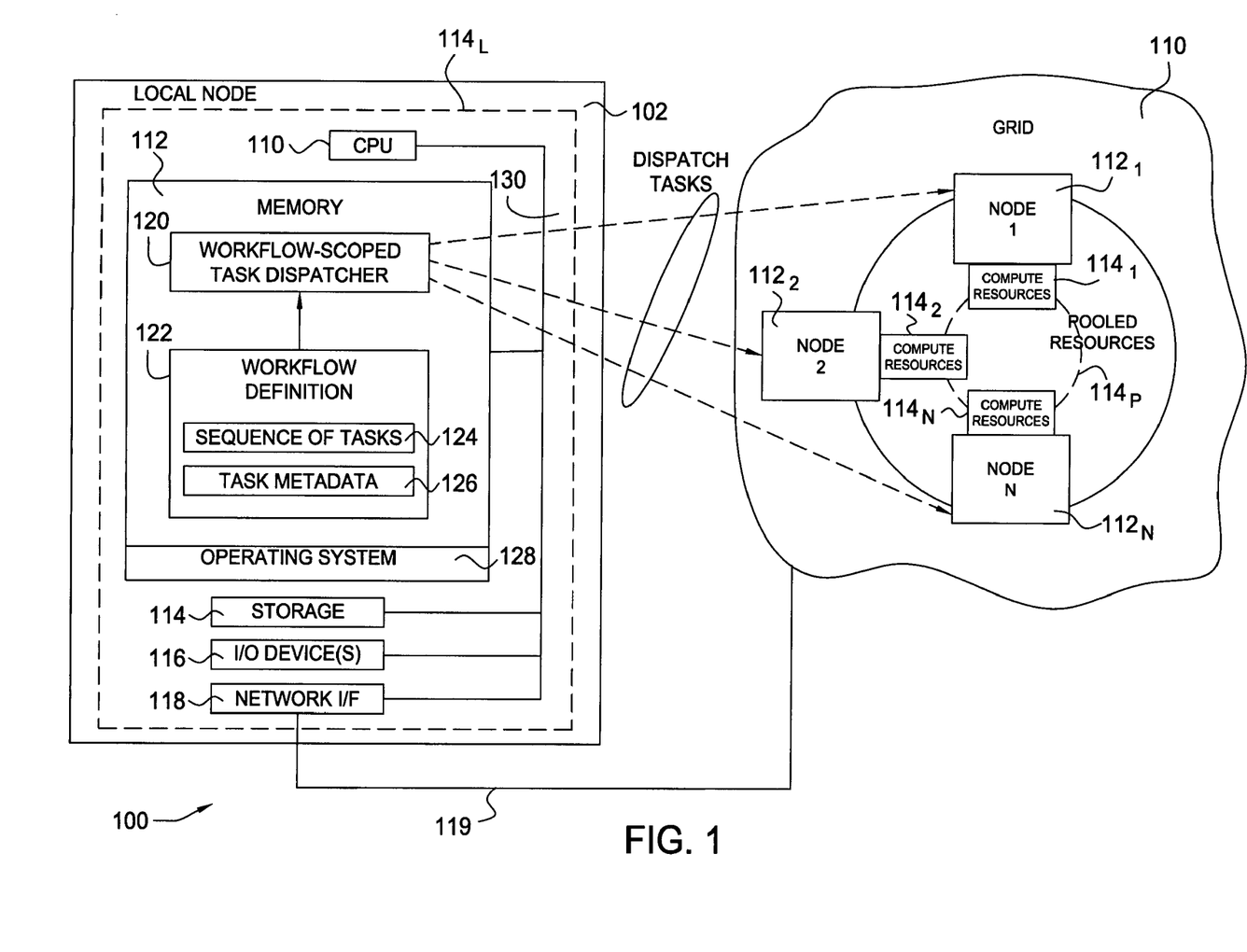
FIG. 1 illustrates a grid computing system in which embodiments of the present invention may be utilized.

Embodiments of the present invention may be implemented as a program product, for example, including a workflow-scoped task manager 120, for use in executing a workflow in the grid computing environment 100 shown in FIG. 1. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In the following, reference is made to embodiments of the invention. It should be understood, however, that the invention is not limited to any specific embodiments described herein. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether a particular advantage is achieved by a given embodiment is not limiting of the invention. Thus, the following aspects, features, embodiments and advantages are merely illustrative and, unless explicitly present, are not considered elements or limitations of the appended claims.

An Exemplary Grid Computing Environment

FIG. 1 shows an exemplary grid computing environment 100, in which embodiments of the present invention may be utilized. As illustrated, the environment 100 may include a local node 102 connected to (and therefore part of) a grid 110 of other node computers 112 (illustratively, N other node computers $112_{1-N}$ are shown). The term local node is a relative term used to distinguish the node 102 from other nodes $112_{1-N}$ and does not imply any particular geographic separation between nodes. Each node (102 or 112) may be any suitable type of computer system, including desktop computers (e.g., workstations), servers, handheld devices, and the like. As illustrated, each node has its own set of computing resources 114.

As shown in the local node 102, typical computing resources 114 available at each node may include one or more Central Processing Units (CPUs) 110, memory 112, storage 114, and input/output (I/O) devices 116, which may be connected at the node via a bus 130. Pooled I/O devices 116 may include printers, scanners, media players, and the like. The CPUs may include any number of any type suitable CPU capable of executing instructions for a task dispatched to that node, while the memory 112 may include any suitable type memory, such as random access memory (RAM). Storage 114 may include any combination of storage means, such as one or more Direct Access Storage Devices (DASDs), network accessible storage devices (NASDs), and a redundant array of independent disks (RAIDs).

As illustrated, a network interface 118 may allow for access to the grid, via any suitable type network connection 119, which may include any combination of wired and/or wireless local area networks and wide area networks, including the Internet. While not shown, the local node 102 may also have some type of interface or "grid portal" used to access computing resources 114 on the grid 110. Such an interface may perform various services, such as implementing security measures (e.g., providing a sign-on/sign-off, verification of user credentials, etc.), implementing protocols used for communication between nodes, and the like.

While the exact type of computing resources 114 available at each node may vary, the various computing resources are, in effect, pooled and made accessible to other nodes on the grid 110. A more efficient overall use of computing resources 114 may result, for example, as computing resources 114 on a particular node 112 that may have otherwise stood idle may be utilized to perform a task dispatched from another node 112.

As illustrated, the local node 102 may include a workflow-scoped task dispatch component 120 (hereinafter, simply referred to as the dispatcher 120) configured to execute a workflow against the grid 110. The workflow may be defined by a workflow definition 120, which may include a sequence of tasks 124 and corresponding task metadata 126.

Task Metadata

While metadata conventionally provided within a workflow definition may include information necessary to run all workflow tasks on a common node, such as an identification of inputs required to perform a task and/or an identification of outputs generated by a task, the task metadata 126 may include additional information, not conventionally provided, allowing the dispatcher 120 to optimize workflow execution within the grid environment 100. For example, the task metadata 126 may include an indication of the computing resources required for execution of each task (e.g., CPU, memory, and/or operating system requirements), which may allow the dispatcher 120 to identify and dispatch tasks to nodes 112 having sufficient computing resources 114.

The task metadata 126 may be stored in any suitable form, such as a file accessible by the dispatcher 120. For some embodiments, the task metadata 126 may be stored in an eXtensible Markup Language (XML) document. Table I below provides an example listing of how task metadata may be represented in XML:

TABLE I

```
<WorkflowTask name="clustalW" maxThreadCount=" 10"
averageCPUCycles="
      1730234"> <OSRequirements>
          <OS type=" Linux"> <ProgLocation>/usr/bin/clustalW</
          ProgLocation>
              <WorkingDirectory>/tmp</WorkingDirectory>
              <MinHeap>1 6M</MinHeap>
              <MinSwap>1 6M</MinSwap>
          <OS type="AIX"> <ProgLocation>/bin/clustalW</
          ProgLocation>
              <WorkingDirectory>/tmp</WorkingDirectory>
              <MinHeap>8M</MinHeap>
              <MinSwap>8M</MinSwap>
      </OSRequirements>
      <TaskInput>
          <stdin>.tcp</stdin>
          <parm name="f">$file</parm>
      </TaskInput>
      <TaskOutput>
          <stdout>tcp</stdout>
          <stderr>log</stderr>
          <file count="2">$sharedFilesystem/clustalW/
          $jobID</file> </TaskOutput>
              </WorkflowTask>
```

As illustrate, the metadata is for a task named "clustalW" and contains information regarding processing requirements of the task (illustratively, as thread count and average CPU cycles required for execution), operating system requirements, as well as an indication of the inputs required and outputs generated by the task. Illustratively versions of a program used to perform the task are available that operate under Linux® and AIX® operating systems (AIX is a registered trademark of International Business Machines Corporation in the United States, other countries, or both). As will be described in greater detail below, for some embodiments, some portions of this metadata may be updated during runtime. For example, average cycle counts for a task may be updated after a number of executions.

Workflow-Scoped Grid Task Dispatching

Figure 2:
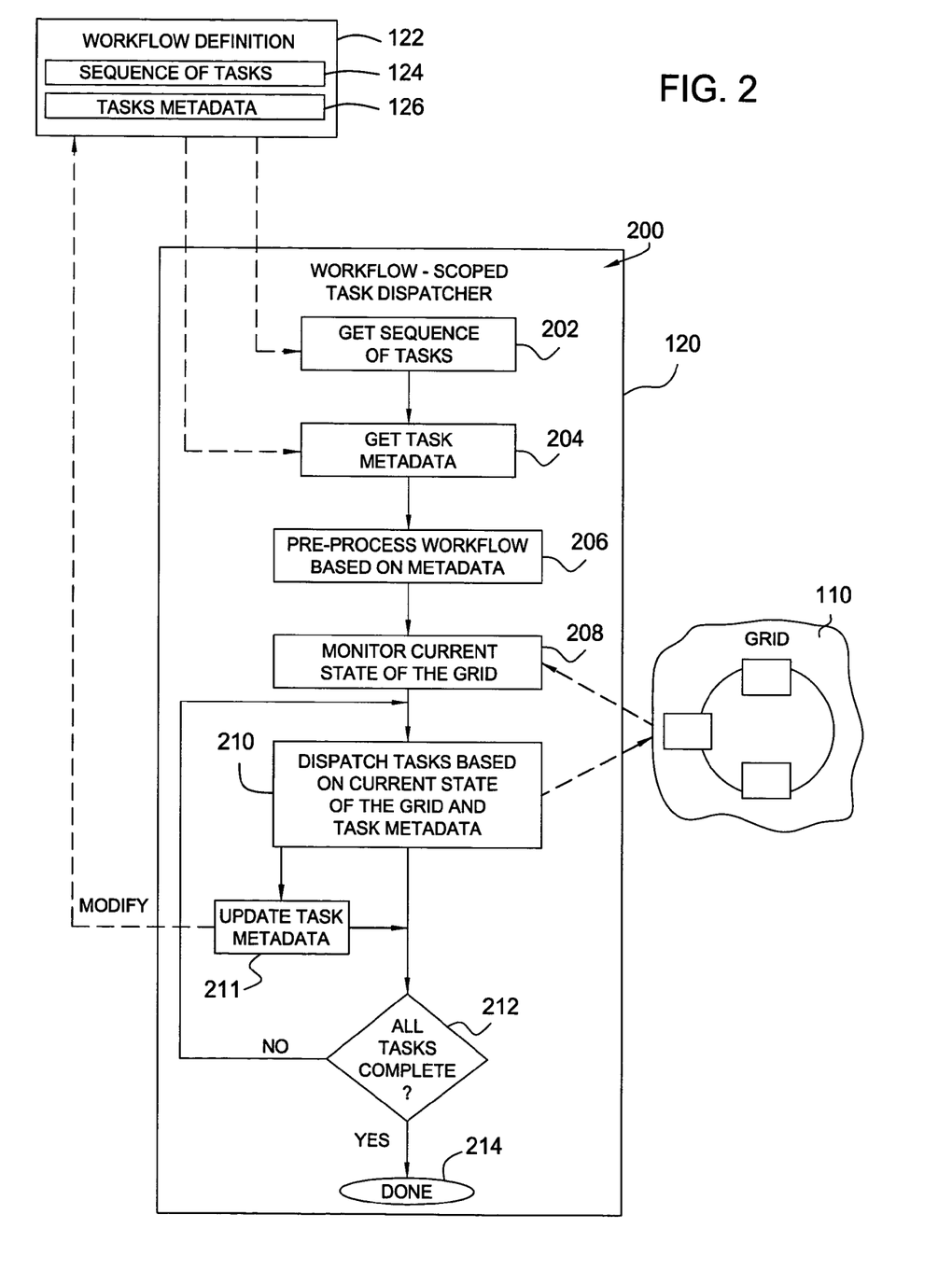
FIG. 2 is a flow diagram of exemplary operations for dispatching workflow tasks based on task metadata and a current state of a grid computing system in accordance with embodiments of the present invention.

FIG. 2 is a flow diagram of exemplary operations 200 that illustrate how the dispatcher 120 may utilize the task metadata 126 to optimally assign tasks to nodes 112 on the grid 110. Thus, the operations 200 may be useful in describing components shown in FIG. 1. The operations begin by obtaining the sequence of tasks 124 and corresponding task metadata 126 for a workflow to be performed, at steps 202 and 204, respectively.

At step 206, the dispatcher 120 may pre-process the workflow based on the task metadata 126. As an example, for some embodiments, the dispatcher 120 may assemble a list of tasks to be performed in descending order based on the amount of computing resources required (e.g., amount of memory, CPU requirements, etc.). As another example, the dispatcher 120 may identify a set of tasks that may be run in parallel and, thus, dispatched to separate nodes 112 for execution.

In any case, at step 208, the dispatcher 120 monitors the current state of the grid 110, for example, to determine what computing resources 114 of what nodes 112 are available. At step 210, the dispatcher 120 dispatches one or more tasks based on the current state of the grid 110 and the task metadata 126. For some embodiments, the dispatcher 120 may be configured to optimize assignments of tasks to nodes taking into account both static features of each node, as well as dynamic features. Examples of static node features may include a type of processor, operating system and/or middleware infrastructure for a given node. Examples of dynamic features may include available CPU capacity, memory, paging rates, and the like. In any case, given the information available in the task metadata 126, the dispatcher 120 may be able to more effectively assign tasks in a workflow to nodes 112, based on their available computing resources 114.

One example is the situation where the workflow indicates that multiple tasks can be run in parallel. Taking into account the overall workflow, based on the sequence of tasks 124 and task metadata 126, the dispatcher 120 may schedule the set of parallel tasks by compute resource required and dispatch the most resource intensive task to the node 112 that best matches those resource requirements. For example, at a given point in a workflow, there may be three tasks (1, 2, and 3) that may be performed in parallel, with the task metadata 126 identifying that task 3 consumes double the amount of CPU and memory resources of the other two tasks. A conventional task-scoped dispatcher may identify available nodes and dispatch tasks 1, 2 and 3 based on node availability, which may likely lead to task 1 being dispatched to a more capable node than task 3. However, given the benefit of the task metadata 126, the workflow-scoped dispatcher 120 described herein may locate the most capable node for task 3, before dispatching the other 2 tasks.

For some embodiments, the dispatcher 120 may update task metadata 126, at step 211, as statistics regarding task execution are obtained at runtime. For example, metadata for a particular task may be updated to include more precise resource requirement information after monitoring actual resource consumption during one or more previous executions of the task. As another example, the execution time of one or more particular tasks may be tracked and stored as metadata which may assist the dispatcher in task scheduling (e.g., assuming two given tasks do not need to be performed in any particular order, the task requiring the most execution time may be scheduled for dispatched first or dispatched to a node having the most available computing resources 114). In some cases execution times of the same task on different nodes may be recorded as metadata, which may allow an optimal node for executing the task to be chosen at a later time if multiple nodes are available. As illustrated, the dispatcher 120 may continue to monitor the state of the grid 110 and dispatch tasks accordingly, until all of the tasks have completed, as determined at step 212, at which time the operations 200 may be terminated, at step 214.

Deferred Task Dispatch

Figure 3:
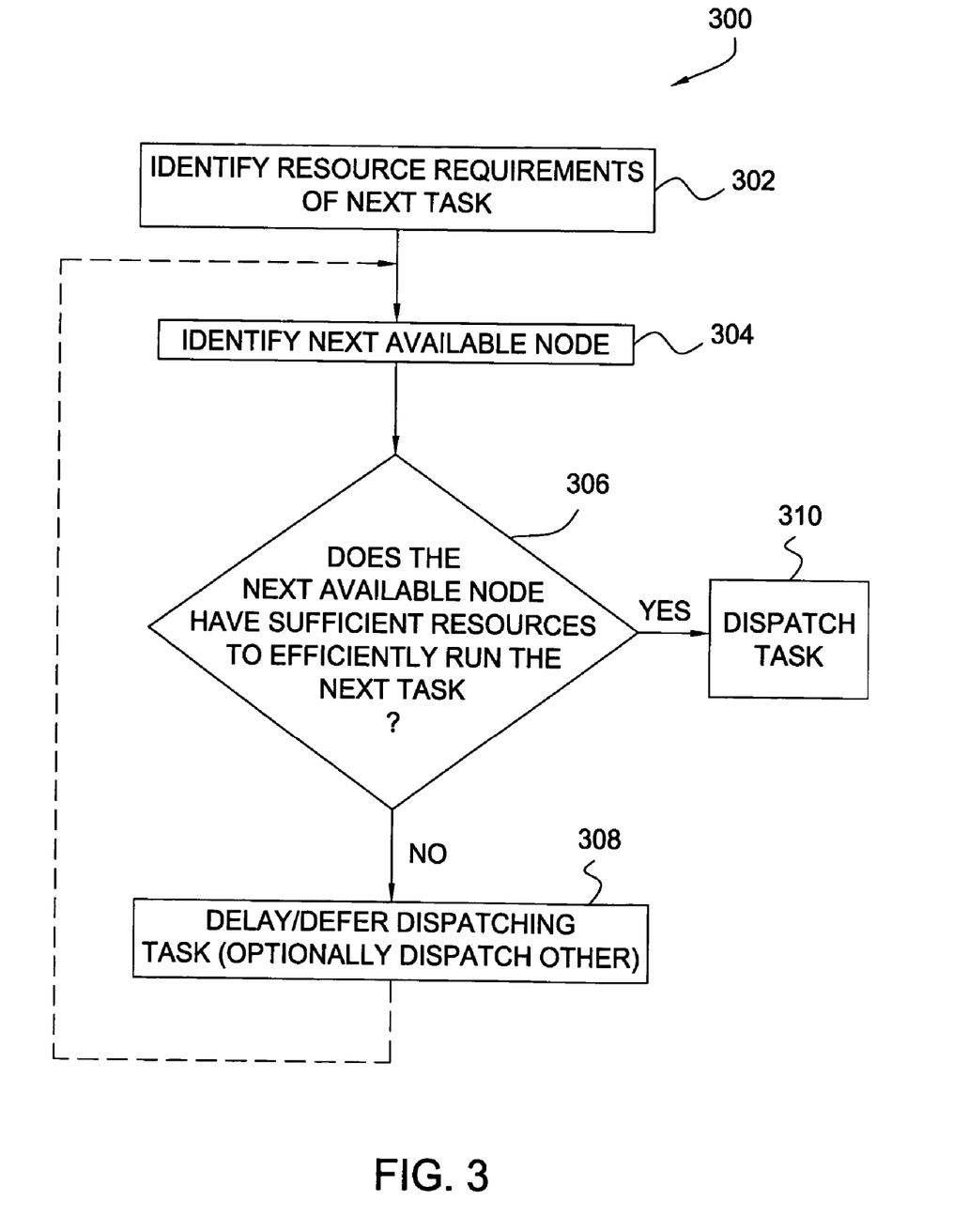
FIG. 3 is a flow diagram of exemplary operations for deferred dispatching of workflow tasks based on task metadata and a current state of a grid computing system in accordance with embodiments of the present invention.
Figure 4:
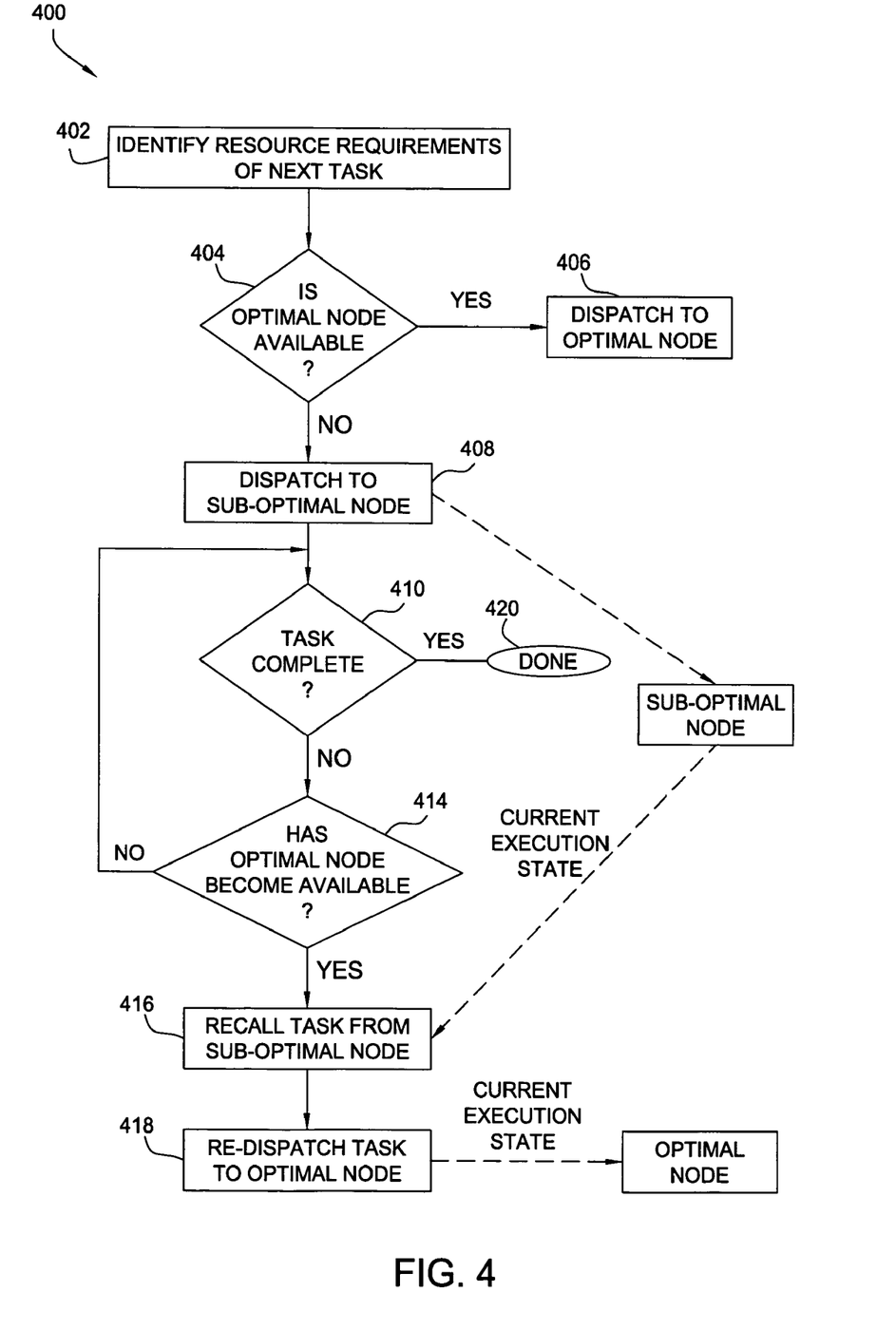
FIG. 4 is a flow diagram of exemplary operations for recalling and re-dispatching workflow tasks based on task metadata and a current state of a grid computing system in accordance with embodiments of the present invention.
Figure 5:
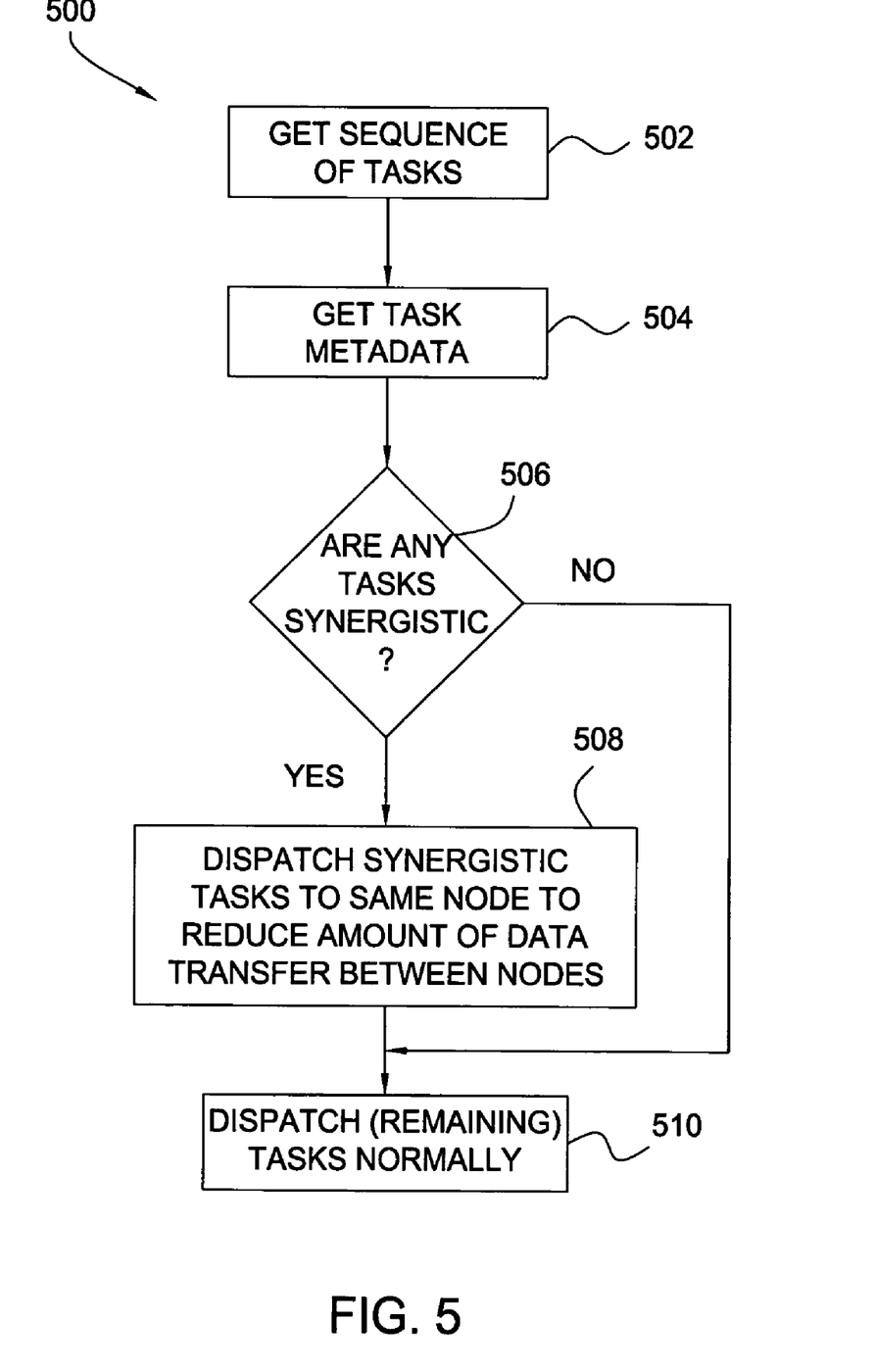
FIG. 5 is a flow diagram of exemplary operations for dispatching synergistic workflow tasks to nodes in a grid computing system in accordance with embodiments of the present invention.

FIGS. 3-5 illustrate operations for particular algorithms for dispatching tasks based on task metadata 126 and the state of the grid 110. For example, FIG. 3 illustrates exemplary operations 300 for deferring dispatch of a given task if an optimal node for performing that task is not available. For example, the operations 300 may be performed when nodes 112 in the grid 110 are only available for a limited time and, further, that only certain nodes 112 have sufficient computing resources 114 to perform certain tasks in a workflow. It is assumed that, prior to commencing the operations 300, that a sequence of tasks and task metadata has been received (e.g., per steps 202 and 204 of FIG. 2).

At step 302, the resource requirements of a next task to be performed are identified and, at step 304, the next available node is identified. If the next available node does not have sufficient resources to efficiently run the next task, as determined at step 306, dispatching of that task is deferred (or delayed), at step 308. For some embodiments, if the task is deferred, other tasks may be dispatched ahead of the task, for example, assuming the tasks do not have to be performed in any particular order. If the tasks do have to be performed in a particular order, the next task may simply be delayed. In any case, the dispatcher 120 may repeat operations 304-306 until a node having sufficient resources becomes available, at which time the task may be dispatched to that node, at step 310.

As an example of when it may be advantageous for a task may be deferred, a task to be performed that requires 1 MB of virtual memory may be considered. While a conventional task-scoped dispatcher may simply find the next available node and dispatch the task to that node, regardless of the available resources, if that available node happened to be a low memory system, it could take a very long while to execute the task due to a high level of paging activity. The workflow-scoped dispatcher 120, however, may recognize cases where it is better to delay dispatching a task until a node 112 with suitable resources becomes available, thus avoiding potentially long execution times that may be caused by dispatching the task to a node 112 with insufficient resources.

Task Recall and Re-Dispatch

In some cases, even if an optimal node for processing a given task is not available, the task may be initiated and productive work may be performed on a sub-optimal node. In such cases, it may be beneficial to first dispatch the task to the sub-optimal node to begin work on the task and, if/when the optimal node does become available at a later time, recall the task from the sub-optimal node and re-dispatch the task on the optimal node.

FIG. 4 illustrates exemplary operations 400 for recalling and re-dispatching a task. The operations 400 begin, at step 402, by identifying resource requirements of a next task to be performed. Again, it is assumed that, prior to commencing the operations 400, that a sequence of tasks and task metadata has been received. If an optimal node is currently available, as determined at step 404 (e.g., by monitoring the current state of the grid), the task is dispatched to the optimal node, at step 406.

On the other hand, if an optimal node is not currently available, the task is dispatched to a sub-optimal node, at step 408, and the dispatcher 120 enters a loop of operations 410-414 to monitor task completion and/or availability of an optimal node. At step 410, if the task has completed (on the sub-optimal node and before an optimal node became available), the operations 400 are terminated, at step 420. Otherwise, a check is performed, at step 414, to determine if an optimal node has become available. If not, the operations 410-414 are repeated, either until the task has completed or until an optimal node becomes available.

Once an optimal node has become available, the task is recalled from the sub-optimal node, at step 416 and re-dispatched to the optimal node, at step 418. For some embodiments, the dispatcher 120 may, in conjunction with tasks written to handle interrupts, at its discretion recall a task from a node 112 on the grid 110. Generally speaking, the process of recall stops the task, collects its current execution state (which can include copying relevant memory structures involved in the task) and passes that information back to the dispatcher 120 for use in redeploying the task to a new (e.g., optimal) node within the grid. An optimized version of this recall and re-deploy may be a direct node to node redeploy based on a directive from the dispatcher 120 (e.g., this recall may be considered more like a transfer).

Recall and re-deployment may be useful in situations where an optimal "best fit" node is not currently available, but productive work can be handled via suboptimal nodes. For some embodiments, as optimal nodes become available, the dispatcher 120 may attempt to estimate the amount of work remaining for the task and, if warranted based on estimated savings by re-deploying the task on an optimal node, the dispatcher 120 will recall the task for redeployment. For some embodiments, this type of function can be used in combination with other concepts, such as assigning priorities to tasks, for example, allowing a task to execute on the grid as long as there are resources available for it to use and no higher priority tasks exist. As higher priority tasks become ready for dispatch, re-deployable tasks can be recalled and deferred for later redeployment.

Assignment of Synergistic Tasks

In some cases, more efficient use of computing resources may be achieved by assignment of certain synergistic tasks to the same compute node. As an example, there may be two tasks that appear within the same workflow, with one of the tasks generating a file that the other task consumes. Given that a number of grid computing environments make use of shared file systems which involving client-side caching of files, faster workflow execution and reduced network traffic can be realized by dispatching the two tasks to the same node where they can take advantage of the local file cache. In other words, assigning the synergistic tasks to the same node may avoid the need to re-fetch the file from a central file server, which might happen if the tasks were dispatched to separate nodes.

FIG. 5 illustrates exemplary operations 500 that the dispatcher 120 may perform to assign synergistic tasks. The operations 500 begin, by obtaining a sequence of tasks and corresponding task metadata, at steps 502 and 504, respectively. At step 506, a determination is made as to whether any tasks are synergistic. For example, the dispatcher 120 may examine the task metadata 126 for each task, in an effort to identify tasks whose output generated matches the input required by other tasks.

If synergistic tasks are identified, the synergistic tasks are dispatched to the same node (e.g., in an effort to reduce data transfer between nodes), at step 508. In some cases, there may be a number of intervening tasks between any two synergistic tasks in a workflow that might prevent immediate dispatch of all synergistic tasks to the same node (e.g., synergistic tasks need not be adjacent and sequential). Accordingly, for some embodiments, the dispatcher 120 may maintain metadata about synergistic tasks, for example, in order to keep track of the node to which the first task of a set of synergistic tasks was dispatched and attempt to dispatch remaining tasks in the synergistic set to the same node. In any case, remaining (non-synergistic) tasks may be dispatched normally (e.g., according to any of the previously described operations shown in FIGS. 2-4), at step 510.

CONCLUSION

A workflow-scoped grid task dispatcher may be configured to optimize workflow execution by assigning workflow tasks to the best available nodes on the grid to perform those tasks, based on corresponding task metadata and a current state of the grid. As a result, more efficient utilization of computing resources available on the grid may be achieved than if the same tasks were assigned using a conventional task-scoped grid task dispatcher.

While the foregoing is directed to embodiments of the present invention, other and further embodiments of the invention may be devised without departing from the basic scope thereof, and the scope thereof is determined by the claims that follow.

What is claimed is:

1. A method of executing a workflow in a grid computing environment, comprising:
    obtaining a sequence of tasks to be performed as part of the workflow;
    obtaining task metadata providing information regarding resource requirements for one or more tasks from the sequence of tasks;
    monitoring a current state of the grid computing environment to identify and obtain information regarding available resources of one or more computing nodes in the grid computing environment; and
    dispatching the one or more tasks to the one or more nodes, based on the obtained task metadata and the current state of the grid, wherein at least one of the nodes of the one or more nodes in the grid computing environment is an optimal node for performing a task from the one or more tasks, relative to other nodes of the one or more nodes and wherein dispatching the one or more tasks to the one or more nodes comprises:
        if the optimal node is unavailable, dispatching the task to a node in the grid computing environment that is sub-optimal for performing the task; and
        if the optimal node becomes available, prior to completion of the task on the sub-optimal node, recalling the task from the sub-optimal node and dispatching the task to the available optimal node.

2. The method of claim 1, further comprising generating a list of the one or more tasks from the sequence of tasks, wherein the generated list orders the sequence of tasks in an order dependent upon their resource requirements.

3. The method of claim 2, wherein dispatching the one or more tasks to the one or more nodes, based on the obtained task metadata and the current state of the grid, further comprises:
    dispatching a first task that requires more computing resources relative to a second task to a node having more available computing resources relative to a second node; and
    dispatching the second task to the second node.

4. The method of claim 1, wherein the obtained task metadata comprises, for at least one task, an identification of an operating system required to perform the task.

5. The method of claim 1, wherein:
    recalling the task from the sub-optimal node comprises collecting information regarding a current execution state of the task; and
    dispatching the task to the available optimal node comprises providing the available optimal node with the current execution state of the task.

6. The method of claim 1, further comprising:
    determining if two or more tasks from the sequence of tasks are synergistic; and
    if so, dispatching the two or more synergistic tasks to a common node for execution.

7. The method of claim 6, wherein determining if two or more tasks from the sequence of tasks are synergistic comprises:
    examining the obtained task metadata to determine if a first one of the tasks generates, as output, data required as input by a second one of the tasks; and
    if so, concluding the first and second tasks are synergistic.

8. The method of claim 1, wherein obtaining the task metadata comprises accessing an eXtensible Markup Language (XML) document.

9. The method of claim 1, further comprising updating the obtained task metadata.

10. The method of claim 9, wherein updating the obtained task metadata comprises updating data related to an execution time of a task.

11. The method of claim 10, wherein the data related to an execution time of a task comprises data related to an execution time of the task on more than one node.

12. The method of claim 9, wherein updating the obtained task metadata comprises updating the obtained task metadata to reflect an amount of resources consumed during execution of a task.

13. A computer-readable storage medium containing a program for executing a workflow in a grid computing environment which, when executed by a processor, performs operations comprising:
    obtaining a sequence of tasks to be performed as part of the workflow;
    obtaining task metadata providing information regarding resource requirements for one or more tasks from the sequence of tasks;
    monitoring a current state of the grid computing environment to identify and obtain information regarding available resources of one or more computing nodes in the grid computing environment; and
    dispatching the one or more tasks to the one or more nodes, based on the obtained task metadata and the current state of the grid, wherein at least one of the nodes of the one or more nodes in the grid computing environment is an optimal node for performing a task from the one or more tasks, relative to other nodes of the one or more nodes and wherein dispatching the one or more tasks to the one or more nodes comprises:
        if the optimal node is unavailable, dispatching the task to a node in the grid computing environment that is sub-optimal for performing the task; and
        if the optimal node becomes available, prior to completion of the task on the sub-optimal node, recalling the task from the sub-optimal node and dispatching the task to the available optimal node.

14. The computer-readable storage medium of claim 13, wherein:

recalling the task from the sub-optimal node comprises collecting information regarding a current execution state of the task; and dispatching the task to the available optimal node comprises providing the available optimal node with the current execution state of the task.

15. The computer-readable storage medium of claim 13, wherein the operations comprise:

determining if two or more tasks from the sequence of tasks are synergistic; and if so, dispatching the two or more synergistic tasks to a common node for execution.

16. The computer-readable storage medium of claim 15, wherein determining if two or more tasks from the sequence of tasks are synergistic comprises examining the obtained task metadata to determine if a first one of the tasks generates, as output, data required as input by a second one of the tasks.

17. A system for executing a workflow in a grid computing environment, comprising:

a computer processor;

a sequence of tasks to be performed as part of the workflow;

task metadata including, at least, information regarding resources required by one or more tasks from the sequence of tasks; and a workflow-scoped task dispatcher which, when executed by a processor, is configured to:

monitor a current state of the grid computing environment to identify and obtain information regarding available resources of one or more computing nodes in the grid computing environment; and dispatch the one or more tasks to the one or more nodes, based on the obtained task metadata and the current state of the grid, wherein the workflow-scoped task dispatcher is further configured to:

determine that one or more nodes in the grid computing environment are optimal for performing a task from the one or more tasks;

if no optimal node for performing the task is available, dispatch the task to a node in the grid computing environment that is sub-optimal for performing the task; and if an optimal node from the one or more optimal nodes for performing the task becomes available, prior to completion of the task on the sub-optimal node, recall the task from the sub-optimal node and dispatch the task to the available optimal node.

18. The system of claim 17, wherein the workflow-scoped task dispatcher is further configured to:

collect information regarding a current execution state when recalling the task from the sub-optimal node; and provide the available optimal node with the current execution state of the task when dispatching the task to the available optimal node.

19. The system of claim 17, wherein the workflow-scoped task dispatcher is further configured to:

examine the obtained task metadata to determine if a first one of the tasks generates, as output, data required as input by a second one of the tasks; and if so, dispatch the first and second tasks to a same node of the one or more nodes.

20. The system of claim 17, wherein the obtained task metadata is stored in one or more eXtensible Markup Language (XML) documents.

21. The system of claim 17, wherein the workflow-scoped task dispatcher is further configured to modify the obtained task metadata.

22. The system of claim 21, wherein the workflow-scoped task dispatcher is further configured to modify the obtained task metadata based on one or more statistics gathered from previous executions of the one or more tasks.

23. The system of claim 21, wherein the workflow-scoped task dispatcher is further configured to modify the obtained task metadata based on the amount of resources consumed during execution of the one or more tasks.

24. The system of claim 17, wherein the obtained task metadata identifies one or more operating systems a node must be running to perform the one or more tasks.

* * * * *